July 11, 1939.　　　　P. CARLSON　　　　2,165,452
TRUCK
Filed Feb. 3, 1937　　　2 Sheets-Sheet 1
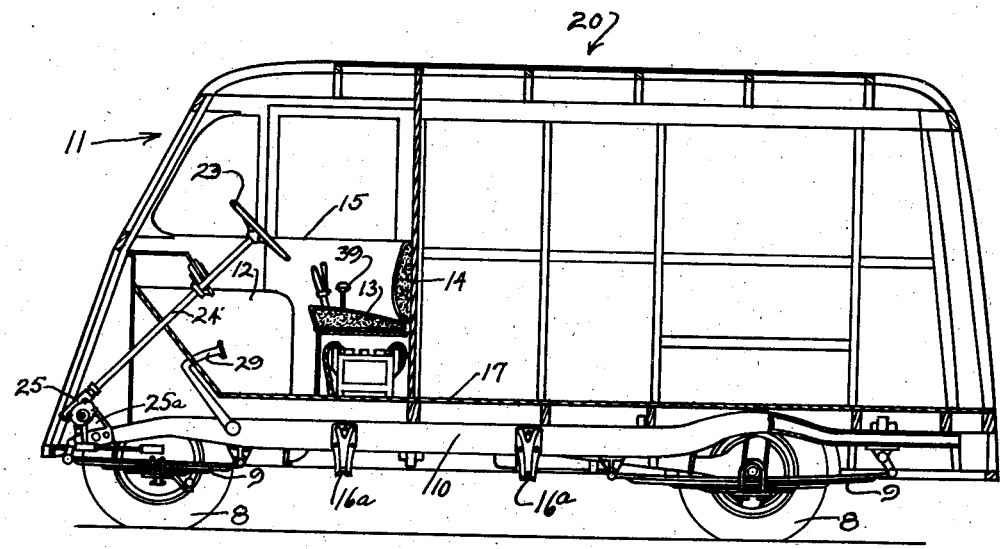
FIG. 1
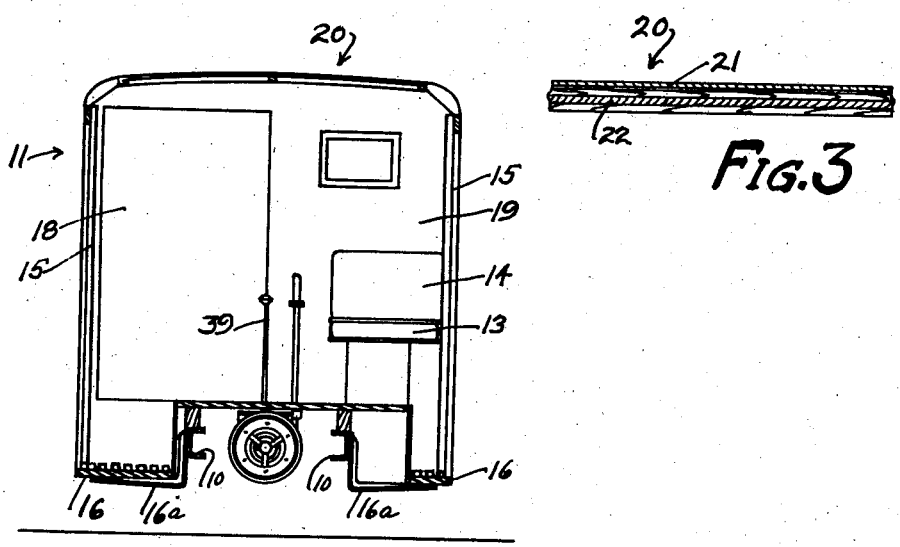
FIG. 2
FIG. 3
INVENTOR
Philip Carlson
BY John F. Hanrahan
ATTORNEY

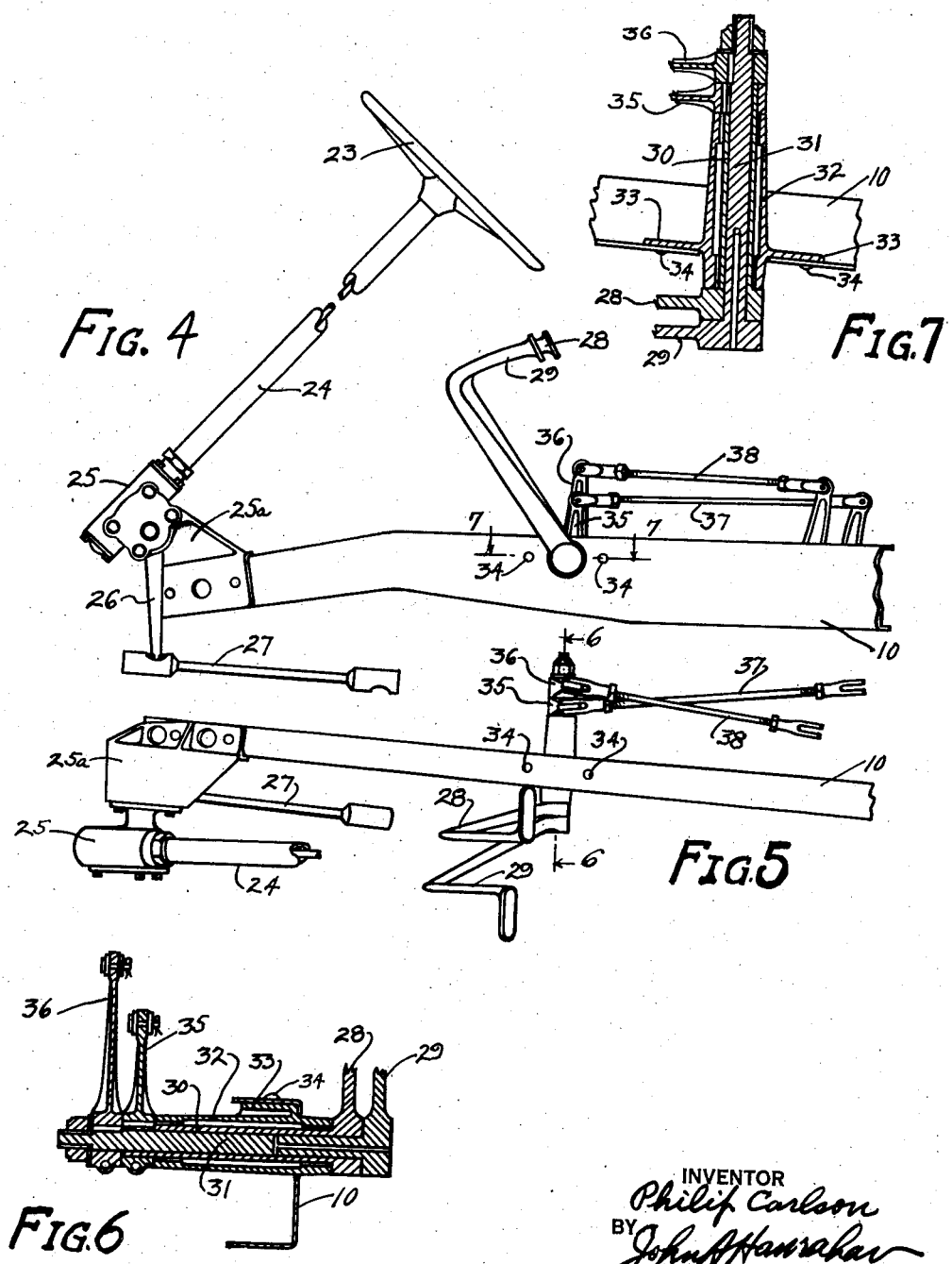

Patented July 11, 1939

2,165,452

UNITED STATES PATENT OFFICE 2,165,452

TRUCK

Philip Carlson, Long Hill, Conn., assignor, by direct and mesne assignments, to The Metropolitan Body Company, Bridgeport, Conn., a corporation of Connecticut Application February 3, 1937, Serial No. 123,771

2 Claims. (Cl. 180—54)

This invention relates to new and useful improvements in commercial vehicles and has particular relation to means and methods of increasing the pay load capacity of light commercial trucks.

The invention comprehends a method whereby the parts of a light truck are rearranged or rebuilt to the end that for the carrying of light weight but bulky loads the capacity of such trucks is doubled. Other advantages of the present improvement reside in the fact that with a truck constructed as hereinafter disclosed the driver's visibility is greatly increased, the ease or convenience with which he may enter and leave the truck is increased and the space for the additional pay load is obtained without increasing the overall length or width of the truck.

Other objects and advantages will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings—

Fig. 1 is a longitudinal sectional view through a truck constructed according to the present invention;

Fig. 2 is a transverse sectional view through the truck just forwardly of the driver's seat;

Fig. 3 is an enlarged detail sectional view through a portion of the roof panel;

Fig. 4 is a side elevational view on an enlarged scale and showing the rearrangement of the operating mechanism;

Fig. 5 is a plan view of the parts of Fig. 4;

Fig. 6 is a vertical sectional view taken substantially along the line 6—6 of Fig. 5; and Fig. 7 is a sectional view taken substantially along the line 7—7 of Fig. 4.

Referring in detail to the drawings the vehicle includes the frame members 10, shown as comprising channel bars, and also includes the usual spring means 9 and the ground engaging wheels 8. The usual body and engine hood are omitted and according to the invention certain of the controls, as the foot brake pedal, the clutch operating pedal and the steering mechanism are moved forward and a body 11 of new construction is mounted on the chassis. In this way the carrying capacity of the truck is greatly increased in so far as the carrying of light weight but bulky loads is concerned.

The forward end of the body 11 encloses the engine and the latter is concealed and insulated, both as to heat and sound, from the interior of the body. The engine concealing and insulating means includes a housing 12. Within the body and slightly to one side of and rearwardly of the housing 12 is the driver's seat 13 equipped with a back 14 of a width slightly greater than that of the seat. It will be clear that with this arrangement the seat has been moved forward from its usual position thus increasing the space in the rear of the seat without increasing the overall length of the truck.

In the new structure sliding doors 15 are provided at each side of the vehicle opposite seat 13. The entrance steps 16 at the sides of the vehicle are mounted on brackets 16a and are within the body 11 as best shown in Fig. 2 so that as the driver mounts a step he is within the body and does not have to duck his head as heretofore when entering the same. In addition to the bringing of the steps into the vehicle one of the changes in the construction resides in increasing the height of the body 11. That is the top of such body is a greater distance from the vehicle floor 17 than has heretofore been the case. Therefore the driver may enter the vehicle without stooping or ducking his head. A sliding door 18 gives access to the compartment in back of the driver's seat and may be slid to and from a position at the rear of the panel 19.

The top of the vehicle body 11 comprises a panel 20 serving to exclude the elements and also to reflect the rays of the sun and thereby prevent heating up of the interior of the body. This panel as shown more particularly in Fig. 3 comprises an upper or outer plate 21 of highly polished aluminum cemented or otherwise permanently secured to an inner portion 22 of ply wood. The wood 22 stiffens the metal plate 21 and also acts as a sound deadener. It will be clear that the outer or upper surface of the plate 21 being highly polished will reflect the rays of the sun and thus prevent heating up of the interior of the truck.

Figs. 4 through 7 illustrate the rearrangement of the brake operating means, the clutch operating means and the steering means. All of these parts are mounted on one of the frame members 10. The steering wheel 23 and its column 24 are moved forwardly as is the usual gear mechanism which is within a base 25 carried by a bracket 25a, the latter being secured on the forward end portion of the frame member 10. The crank or lever 26 from the base 25 now extends downwardly being connected at its lower end, in the usual manner, with a drag or connecting link 27 which at its rear end is connected with a steering knuckle (not shown) usually connected with a steering wheel of the vehicle.

The brake and clutch operating pedals 28 and 29 are moved forwardly to be convenient to the new position of the driver's seat. Pedals 28 and 29 are at the outer side of the frame member 10. Pedal 28 (see Figs. 6 and 7) is integral with or secured to a sleeve 30 while the pedal 29 includes an extension or shaft 31 projecting through and mounted in said sleeve. The mentioned sleeve extends through the frame member 10 and is mounted in bearings in a bracket 32 extending through the frame member and having attaching portions 33 secured to the frame member as by rivets 34. The forward portions of the frame members incline toward one another as is usual and the bracket 32 has its tubular portion at an incline to its attaching portion 33 whereby the sleeve 30 and the shaft 31 extend parallel with the axles of the vehicle.

Attached to the sleeve 30 at the inner side of the frame member 10 is an arm or lever 35 while a similar arm 36 is attached to the inner end portion of the shaft 31. Links or rods 37 and 38 respectively are attached to the upper ends of the levers or arms 35 and 36 and serve to transmit motion from the same to the usual brake and clutch operating means of the vehicle. The gear shift lever 39 is not disturbed and in the new location of the driver's seat is at the side of such seat.

From the foregoing it will be clear that according to the invention the driver's seat of the truck is moved forward and that the brake pedal, the clutch pedal and the steering mechanism are also moved forwardly. These latter parts are moved into positions at the side of the engine. The one piece bearing bracket 32 insures alignment of sleeve 30 and shaft 31 for operation of the clutch and brake means so that there is no likelihood of any binding of parts.

The steps being within the body (the latter being widened) and the top being raised or higher than usual in truck constructions, the driver may enter by stepping onto either of the steps 16 without ducking his head. In fact the distance between the step and the vehicle top is such that a man may stand erect on the steps. The cubic capacity of the truck in the rear of the driver's seat is doubled without any increase in the overall width or length of the body.

Further, in rebuilding the body or rather in building the new body, what has heretofore in truck construction been outside or waste space included within the overall width is converted into useful inside space. That is, without increasing the overall width of the vehicle body, the latter is widened to enclose space formerly at the outside thereof over the running board and fenders. Now the body is carried to the width of the fenders and running board so the space included in the overall width of the truck and formerly wasted is now used. Attention is also called to the fact that the new position of the driver's seat places him up close to the windshield so that the street immediately in front of the vehicle is visible to him.

Having thus set forth the nature of my invention, what I claim is:

1. In an automobile truck comprising a chassis including side frame members mounting a body and between their forward portions mounting an engine for propelling the truck together with the usual braking and clutch connections at the rear of the engine, brake and clutch pedals disposed at the outer side of one of said frame members, a tubular shaft connected with said brake pedal and extending through said frame member, a shaft extending through said tubular shaft and connected with said clutch pedal, a bracket including a plate-like portion secured to said frame member, a tubular bearing carried by said plate-like portion and through which said shafts extend, and means at the inner side of said frame member and connecting the inner portions of said shafts with the usual brake and clutch connections.

2. In an automobile truck including a chassis comprising converging side frame members mounting a body and between their forward portions mounting an engine for propelling the truck together with the usual brake and clutch connections at the rear of the engine, brake and clutch pedals disposed at the outer side of one of said frame members, a tubular shaft connected with said brake pedal and extending through said frame member, a shaft extending through said tubular shaft and connected with said clutch pedal, a bearing on said frame member and through which said shafts extend, said bearing disposed at an angle to said frame member whereby the shafts are arranged parallel with the truck axles, and means at the inner side of said frame member and connecting the inner portions of said shafts with the usual brake and clutch connections.

PHILIP CARLSON.